United States Patent
Huang (10) Patent No.: US 12,400,476 B2
(45) Date of Patent: Aug. 26, 2025

(54) METHOD AND SYSTEM FOR INCREASING FACE IMAGES

(71) Applicants: Interface Technology (ChengDu) Co., Ltd., Sichuan (CN); Interface Optoelectronics (ShenZhen) Co., Ltd., Guangdong (CN); General Interface Solution Limited, Miaoli County (TW)

(72) Inventor: Po-Jui Huang, Guangdong (CN)

(73) Assignees: Interface Technology (ChengDu) Co., Ltd., Sichuan (CN); Interface Optoelectronics (ShenZhen) Co., Ltd., Guangdong (CN); General Interface Solution Limited, Miaoli county (TW)

( * ) Notice: Subject to any disclaimer, the term of this patent is extended or adjusted under 35 U.S.C. 154(b) by 396 days.

(21) Appl. No.: 18/092,449

(22) Filed: Jan. 3, 2023

(65) Prior Publication Data
US 2024/0169758 A1    May 23, 2024

(30) Foreign Application Priority Data
Nov. 18, 2022   (CN) .......................... 202211445172.0

(51) Int. Cl.
*G06V 40/16*   (2022.01)
*G06T 7/70*    (2017.01)

(52) U.S. Cl.
CPC .............. *G06V 40/168* (2022.01); *G06T 7/70* (2017.01); *G06V 40/166* (2022.01); *G06T 2207/30201* (2013.01)

(58) Field of Classification Search
CPC ........... G06T 2207/30201; G06T 11/00; G06T 2207/20081; G06V 10/82; G06V 40/168; G06V 40/171; G06V 10/25
See application file for complete search history.

(56) References Cited

FOREIGN PATENT DOCUMENTS

| CN | 108197543 A | * | 6/2018 | ......... G06K 9/00228 |
| CN | 114267067 A | | 4/2022 | |
| CN | 115147904 A | * | 10/2022 | ........... G06V 10/761 |

OTHER PUBLICATIONS

Shen, Yujun, et al. "Interpreting the latent space of gans for semantic face editing." Proceedings of the IEEE/CVF conference on computer vision and pattern recognition. 2020. (Year: 2020).*

(Continued)

*Primary Examiner* — Sumati Lefkowitz
*Assistant Examiner* — Connor L Hansen
(74) *Attorney, Agent, or Firm* — CKC & Partners Co., LLC (57) ABSTRACT

The present invention provides a method for increasing face images. The method includes: obtaining a face image, and determining whether the face image belongs to a frontal direction or a side direction; transforming the face image into a feature vector; performing a facial attribute editing algorithm according to the feature vector to generate a first generation vector which is different from the face image in at least one attribute; if the face image belongs to the side direction, performing a facial pose conversion algorithm according to the feature vector to generate a second generation vector which is different from the face image in pose directions; inputting the first generation vector or the second generation vector to a generative adversarial network to output at least one generated face image; and adding the face image and the generated face image into a database.

12 Claims, 10 Drawing Sheets

(56) References Cited

OTHER PUBLICATIONS

Abiram, R. Nandhini, P. M. D. R. Vincent, and P. M. D. R. Vincent. "Identity preserving multi-pose facial expression recognition using fine tuned VGG on the latent space vector of generative adversarial network." Math. Biosci. Eng 18.4 (2021): 3699-3717. (Year: 2021).*
Rui Hung et al., "Beyond Face Rotation: Global and Local Perception GAN for Photorealistic and Identity Preserving Frontal View Synthesis", arXiv:1704.04086v2 [cs.CV], pp. 1-11, Aug. 4, 2017.

* cited by examiner

METHOD AND SYSTEM FOR INCREASING FACE IMAGES

RELATED APPLICATIONS

This application claims priority to China Application Serial Number 202211445172.0 filed Nov. 18, 2022, which is herein incorporated by reference.

BACKGROUND

Field of Invention

The present invention relates to a system and a method to increase the number of face images in a database according to a Generative Adversarial Network (GAN).

Description of Related Art

Face recognition and detection have been used in many scenarios and products. When building a face database, it is necessary to take a user's face image. The more face images, the more conducive to subsequent recognition, detection and other algorithms. However, it costs a lot to obtain multiple poses of the same person or images with accessories (such as glasses) and without accessories in a shooting process.

SUMMARY

Embodiments of the present disclosure provide a method performed by a computer system. The method includes: capturing a face image and determining whether the face image belongs to a front direction or a side direction; transforming the face image into a feature vector; performing a facial attribute editing algorithm according to the feature vector to generate a first generation vector, in which at least one attribute of the first generation vector is different from that of the face image; if the face image belongs to the side direction, performing a facial pose conversion algorithm according to the feature vector to generate a second generation vector, in which a pose direction of the second generation vector is different from that of the face image; inputting the first generation vector or the second generation vector into a generative adversarial network to output at least one generated face image; and adding the face image and the at least one generated face image into a database.

In some embodiments, determining whether the face image belongs to the front direction or the side direction includes: flipping the face image along a central axis to obtain a flipped image; calculating a structural similarity index between the face image and the flipped image; and if the structural similarity index is less than a threshold, determining that the face image belongs to the side direction, otherwise determining that the face image belongs to the front direction.

In some embodiments, the step of transforming the face image into the feature vector includes: inputting the face image into an encoder to obtain an initial feature vector; inputting the initial feature vector and a noise vector into a generator to obtain a reconstructed image; calculating a loss function between the face image and the reconstructed image; and adjusting the initial feature vector and the noise vector according to the loss function for multiple iterations, and setting the initial feature vector corresponding to a minimum of the loss function among the iterations as the feature vector.

In some embodiments, method further includes: determining if the at least one generated face image belongs to human face according to a first classifier, and if not, deleting the at least one generated face image; and determining if the face image and the at least one generated face image belongs to a same person according to a recognizer, and if not, deleting the at least one generated face image.

In some embodiments, the method further includes: determining if the at least one generated face image has a predetermined attribute according to a second classifier, and if not, deleting the at least one generated face image.

From another aspect, embodiments of the present disclosure provide a system including an image capture device and a computer. The image capture device is configured to obtain a face image. The computer system is communicatively connected to the image capture device and configured to perform the aforementioned method.

From another aspect, embodiments of the present disclosure provide a non-transitory computer readable storage medium storing multiple instructions which are configured to perform the aforementioned method.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

The using of "first", "second", "third", etc. in the specification should be understood for identifying units or data described by the same terminology, but are not referred to particular order or sequence.

Figure 1:
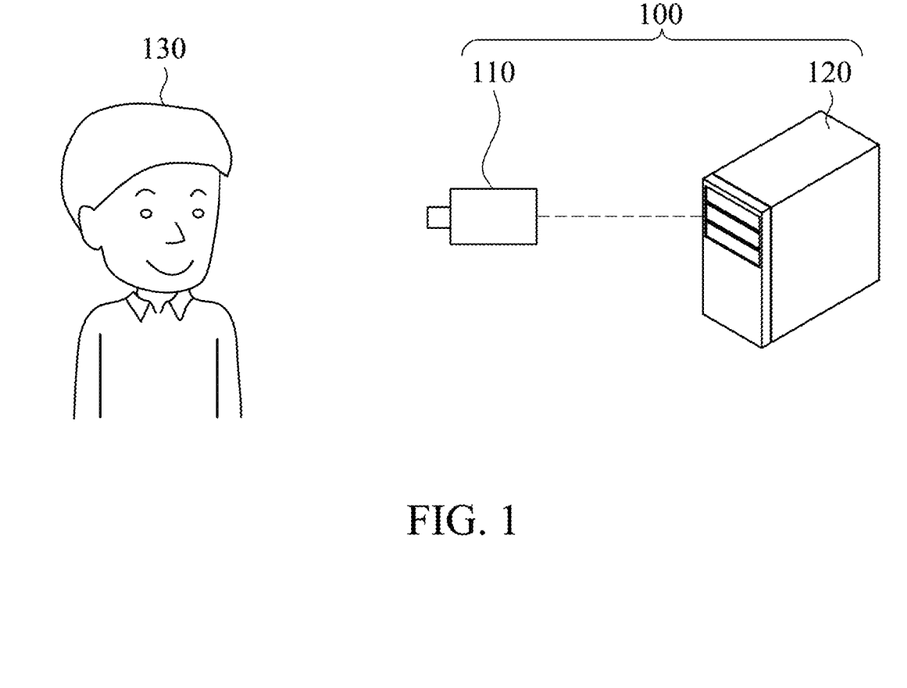
FIG. 1 is a schematic diagram of a system for increasing face image in accordance with an embodiment.

FIG. 1 is a schematic diagram of a system for increasing face image in accordance with an embodiment. Referring to FIG. 1, a system 100 includes an image capture device 110 and a computer system 120. The image capture device 110 is a camera in the embodiment. In some embodiments, the image capture device 110 also includes a depth sensor, an infrared sensor, etc. The computer system 120 may be a personal computer, a server, or any electrical device with computation capability. The computer system 120 is communicatively connected to the image capture device 110 through wire or wireless communication means. The image capture device 110 captures a face image of a user 130. The computer system 120 performs a method for increasing the number of the face image that will be stored in a database. The method will be described in detail below.

Figure 2:
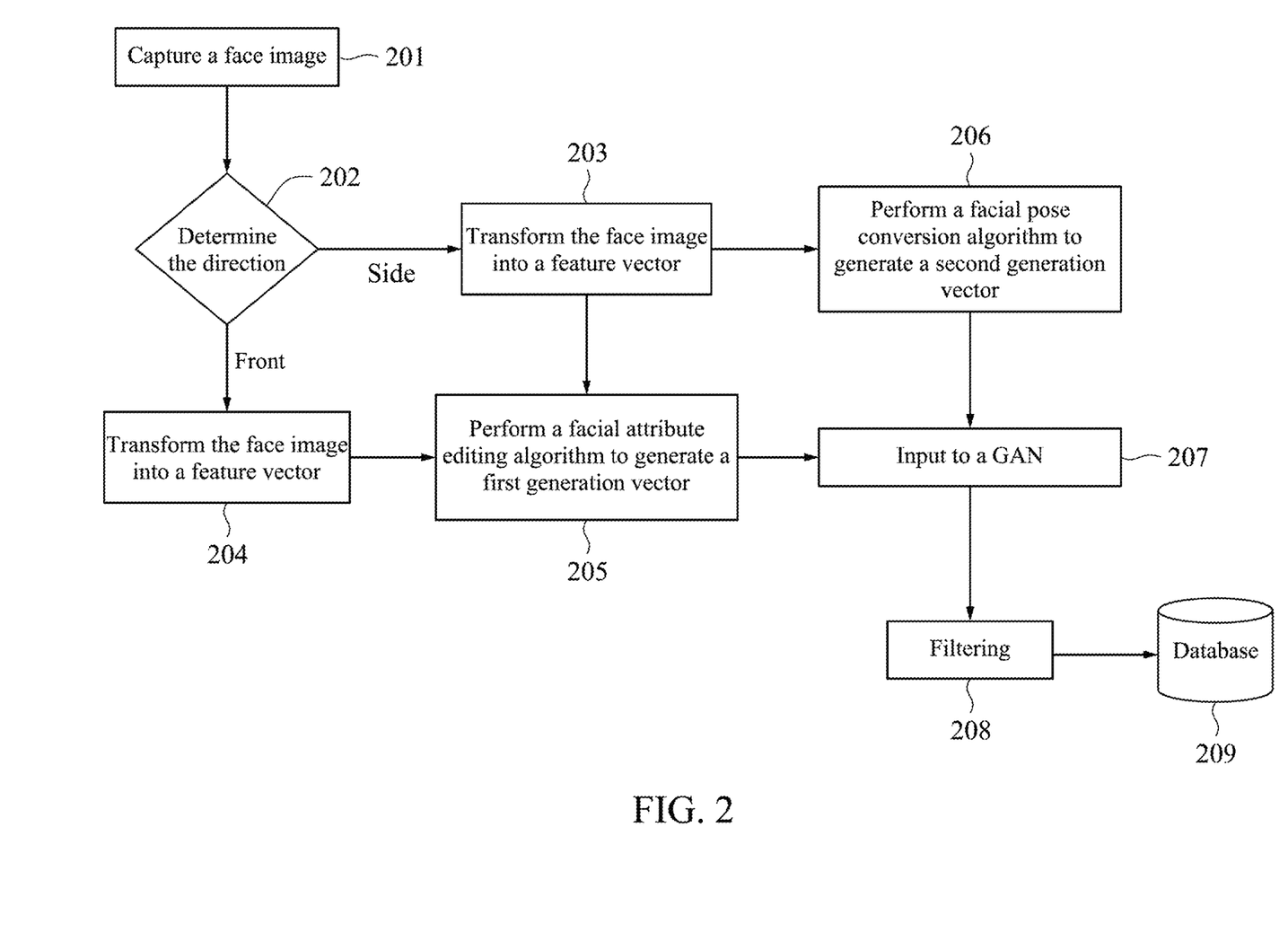
FIG. 2 is a flow chart of a method for increasing the number of the face image in accordance with an embodiment.
Figure 3:
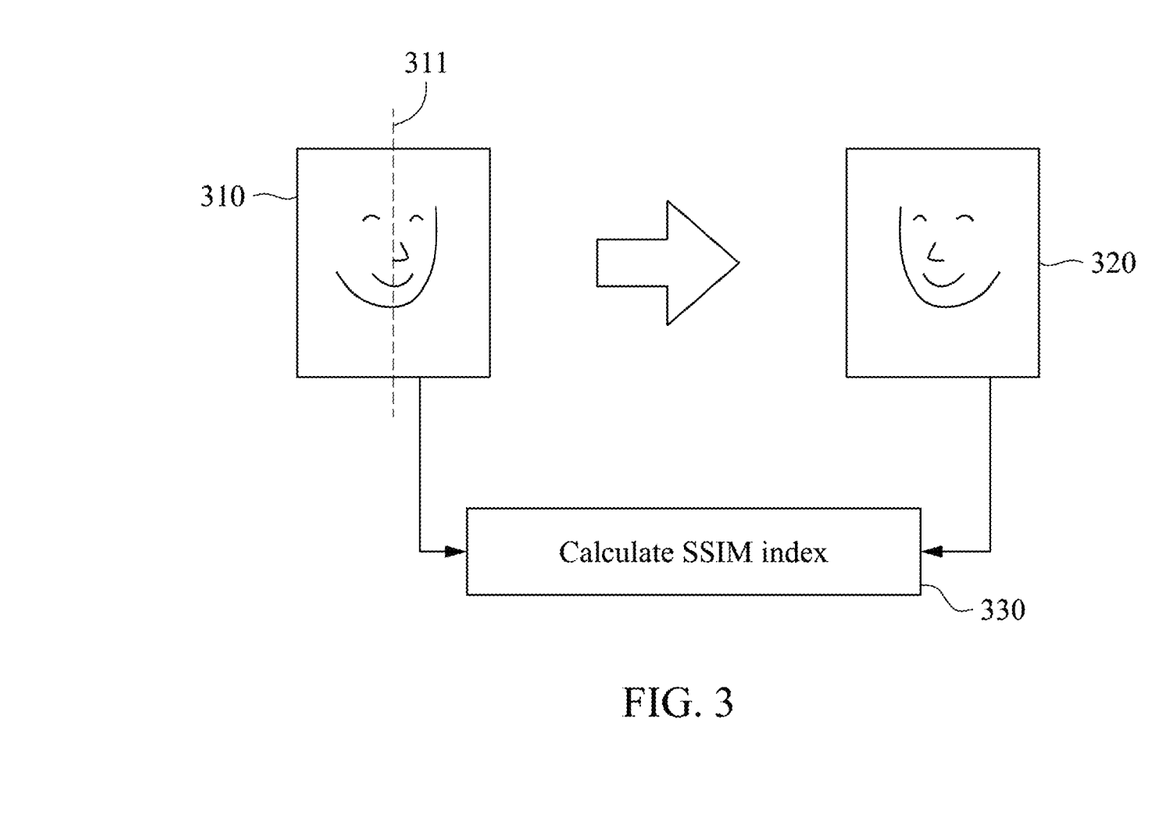
FIG. 3 is a schematic diagram of determining the face direction in accordance with an embodiment.

FIG. 2 is a flow chart of a method for increasing the number of the face image in accordance with an embodiment. Referring to FIG. 2, in step 201, a face image is captured. In step 202, it is determined whether the face image belongs to a front direction or a side direction. FIG. 3 is a schematic diagram of determining the face direction in accordance with an embodiment. Referring to FIG. 3, a captured face image 310 is flipped along a central axis 311 to obtain a flipped image 320. In step 330, a structural similarity (SSIM) index between the face image 310 and the flipped image 320 is calculated. If the face image 310 belongs to the front direction, then the flipped image 320 will be similar to the original face image 310, and the structural similarity index will be great. If the face image 310 belongs to the side direction, the difference between the flipped image 320 and the original face image 310 will be relatively great, and the structural similarity index becomes smaller. Therefore, a threshold (e.g. 0.3) is set. If the structural similarity index is less than the threshold, it is determined that the face image 310 belongs to the side direction, otherwise belongs to the front direction. In other embodiments, a machine learning model or any image processing approach may be adopted to determine whether face image 310 belongs to the front direction or the side direction, which is not limited in the disclosure.

Figure 4:
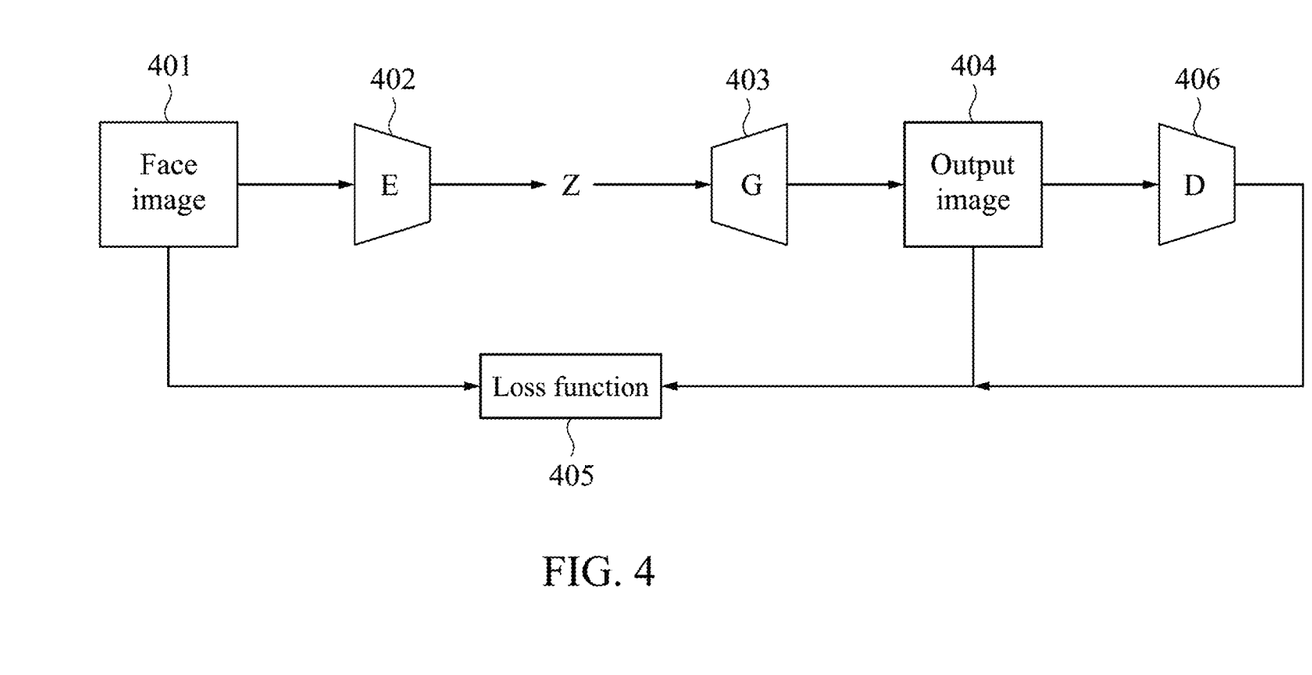
FIG. 4 is a schematic diagram of a generative adversarial network in accordance with an embodiment.

Referring to FIG. 2, if the result of the step 202 is the side direction, then in step 203, the face image is transformed into a feature vector. If the result of the step 202 is the front direction, then in step 204, the face image is also transformed into a feature vector. The 203 is identical to the step 204. In some embodiments, the steps 203 and 204 are merged and performed before or after the step 202, which is not limited in the disclosure. The feature vector is generated based on a generative adversarial network. FIG. 4 is a schematic diagram of the generative adversarial network in accordance with an embodiment. Referring to FIG. 4, the generative adversarial network includes an encoder 402 (i.e. "E" in the figure), a generator 403 (i.e. "G" in the figure), and a discriminator 406 (i.e. "D" in the figure). The encoder 402 transforms a face image 401 into a feature vector (i.e. "Z" in the figure), and the generator 403 reconstructs an output image 404 according to the feature vector. The discriminator 406 determines if the output image 404 is true. The face image 401, the output image 404, and the determination result of the discriminator 406 are substituted to a loss function 405 to train the generator 403. The generative adversarial network may be built based on the paper of "Zhu, J., Shen, Y., Zhao, D., & Zhou, B. (2020, August). In-domain gan inversion for real image editing. In *European conference on computer vision* (pp. 592-608). Springer, Cham", which is incorporated by reference herein (referred to as a first reference paper below). In some embodiments, the generator 403 is built based on the paper of "Karras, T., Laine, S., & Aila, T. (2019). A style-based generator architecture for generative adversarial networks. In *Proceedings of the IEEE/CVF conference on computer vision and pattern recognition* (pp. 4401-4410)", which is incorporated by reference (referred to as a second reference paper) with public face database. In other embodiments, the generator 403 is based on any paper or public document which is not limited in the disclosure.

Figure 5:
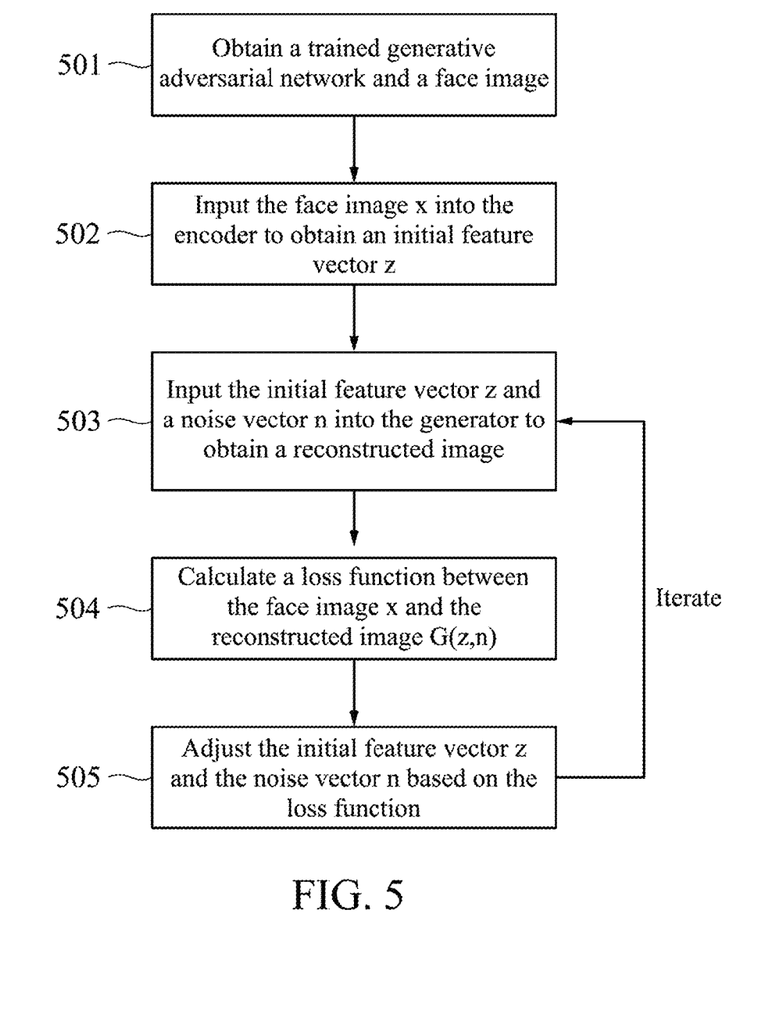
FIG. 5 is a flow chart of generating the feature vector iteratively in accordance with an embodiment.

The encoder 402 is used to generate the feature vector. In particular, the optimal feature vector is found by a way of iteration. FIG. 5 is a flow chart of generating the feature vector iteratively in accordance with an embodiment. Referring to FIG. 5, in step 501, a trained generative adversarial network and a face image are obtained. The generative adversarial network may be built based on the first reference paper. The face image is represented as a vector x. In step 502, the face image x is inputted into the encoder 402 to obtain an initial feature vector represented as a vector z. In step 503, the initial feature vector z and a noise vector n are inputted into the generator 403 to obtain a reconstructed image, and this operation is represented as G(z,n) where G() is the generator 403 and the noise vector n is generated by random variables. In step 504, a loss function between the face image x and the reconstructed image G(z,n) is calculated as the following equation 1.

$$z^{inv}, n^{inv} = \arg\min_{z,n} \|x - G(z, n)\|_2 \qquad \text{[Equation 1]}$$

In step 505, the initial feature vector z and the noise vector n are adjusted based on the loss function. An approach such as gradient descending or a genetic algorithm may be adopted to adjust the initial feature vector z and the noise vector n, which is not limited in the disclosure. The step 503 to the step 505 are iterated for several times (e.g. 100 iterations), and the corresponding loss function is calculated for each iteration. Next, the initial feature vector $z^{inv}$ corresponding to a minimum of the loss function among the iterations is set as the feature vector for the subsequent algorithm. The flow chart of FIG. 5 is to find the feature vector $z^{inv}$ such that the reconstructed image is closest to the input face image. Required time is reduced in this flow chart compared to conventional art because the computation of the loss function is reduced.

Figure 6:
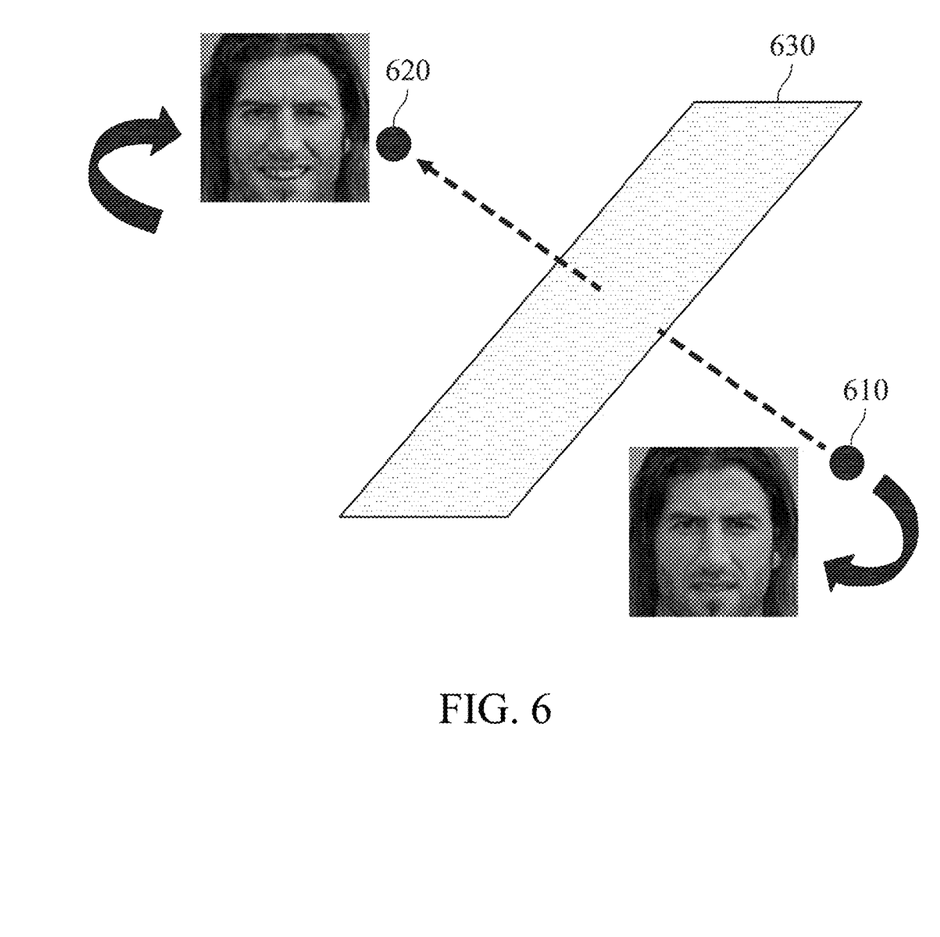
FIG. 6 is a schematic diagram of performing the facial attribute editing algorithm in accordance with an embodiment.

Referring to FIG. 2, after the steps 203 and 204 are done, a step 205 is performed. A facial attribute editing algorithm is performed according to the feature vector $z^{inv}$ to generate a first generation vector. The step 205 may be based on the paper of "Shen, Y., Gu, J., Tang, X., & Zhou, B. (2020). Interpreting the latent space of gans for semantic face editing. In *Proceedings of the IEEE/CVF conference on computer vision and pattern recognition* (pp. 9243-9252)" which is incorporated by reference and referred to as a third reference paper. FIG. 6 is a schematic diagram of performing the facial attribute editing algorithm in accordance with an embodiment. Referring to FIG. 6, here is to convert a face image without a smile to a face image with a smile. The feature vector $z^{inv}$ is illustrated as a coordinate point 610. Multiple face images with smiles and face images without smiles are collected, and then they are transformed into feature vectors to train a support vector machine (SVM) model which contains a hyperplane 630. The right-hand side of the hyperplane 630 indicates the category of "no-smile", and the left-hand side is the category of "smile". The coordinate point 610 is mapped into the other side of the hyperplane 630 as a coordinate point 620 representing the first generation vector. The face image generated by this first generation vector would contain a smile. In other words, an attribute of the first generation vector is different from that of the inputted face image. The attribute in the embodiment is about smile, but it may be about glasses, mask, bangs, etc. in other embodiments which are not limited in the disclosure.

Figure 7:
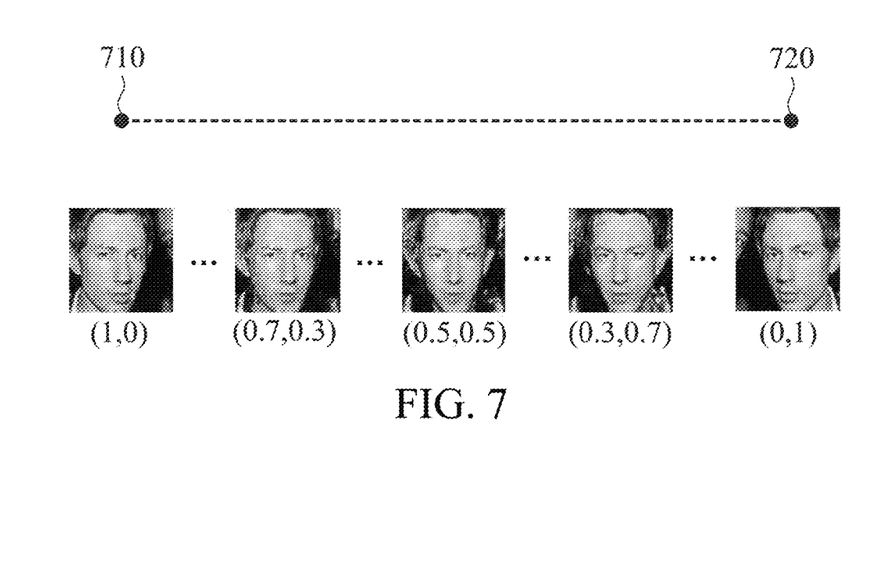
FIG. 7 is a schematic diagram of the facial pose conversion algorithm in accordance with an embodiment.

Referring to FIG. 2, if the face image belongs to the side direction, in a step 206, a facial pose conversion algorithm is performed according to the feature vector to generate a second generation vector. FIG. 7 is a schematic diagram of the facial pose conversion algorithm in accordance with an embodiment. The aforementioned feature vector $z^{inv}$ and the noise vector $n^{inv}$ are illustrated as a vector 710 (also indicates a coordinate point) in FIG. 7. The inputted face image is flipped along the central axis and transformed by the flow chart of FIG. 5 to obtain a feature vector and a noise vector which are illustrated as a vector 720. Since the face image is flipped, the vectors 710 and 720 indicate a right direction and a left direction respectively. Here is to generate face images in other different directions. In detail, a weighting sum of the vectors 710 and 720 is calculated where the summation of two weights is equal to one. The result of the weighting sum is referred to as the second generation vector and is inputted into a generator to obtain the face images in different directions that are illustrated in FIG. 7 with different weights. For example, (1,0) indicates that the weight of the vector 710 is "1", and the weight of the vector 720 is "0"; (0,1) indicates that the weight of the vector 710 is "0", and the weight of the vector 720 is "1", and so on. Therefore, a pose direction of the second generation vector is different from that of the inputted face image. It is shown that the face images with different pose directions may be generated by adjusting the weights.

Note that the facial pose conversion algorithm is not performed to the face image in the front direction in the flow chart of FIG. 2. This is because the image in the front direction is not much different from the flipped image, and thus the effect of the facial pose conversion algorithm is limited.

In step 207, the aforementioned first generation vector and/or the second generation vector are inputted to the corresponding generative adversarial network to output at least one generated face image. The generative adversarial network may be based on any one of the first to third reference paper.

Figure 8:
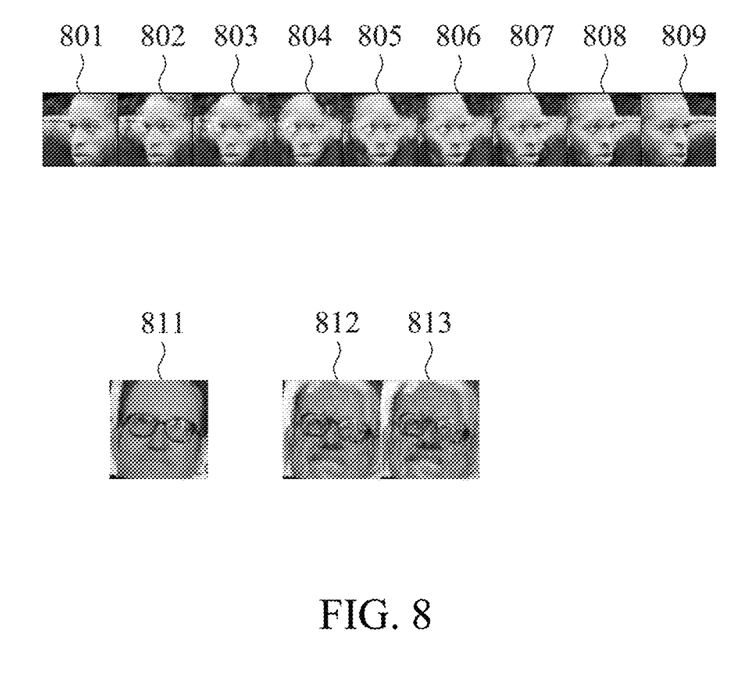
FIG. 8 is a diagram illustrating experiment result in accordance with an embodiment.

In step 208, filtering is performed. The generation of the face images may fail, and therefore unsuitable face images should be deleted. First, a face classifier (also referred to as a first classifier) is used to determine if an image contains a face. It is determined if each generated face image belongs to human face according to the face classifier. If the generated face image does not belong to the human face, then it is deleted. In addition, a recognizer is used to determine if the inputted face image and the generated face image belong to the same person, and if not, the generated face image is deleted. The examples are shown in FIG. 8. A face image 801 is the inputted image. A face image 809 is obtained by flipping the face image 801. Multiple face images 802-808 with different pose directions are generated based on the facial pose conversion algorithm. Since the face images 801 and 809 do not contain features of ears, the generated face images 802-808 also lack features of ears and do not pass the test of the face classifier (i.e. not belong to human face). In addition, a face image 811 is the inputted image. Face images 812 and 813 are generated based on the facial attribute editing algorithm. It was supposed to produce images with blonde hair, but the generated image has been destroyed. The recognizer determines that the generated face images 812 and 813 do not belong to the same person of the face image 811. Therefore, the generated face images 812 and 813 are also deleted. The aforementioned face classifier and recognizer may be based on any machine learning model such as a convolutional neural network which is not limited in the disclosure.

Figure 9:
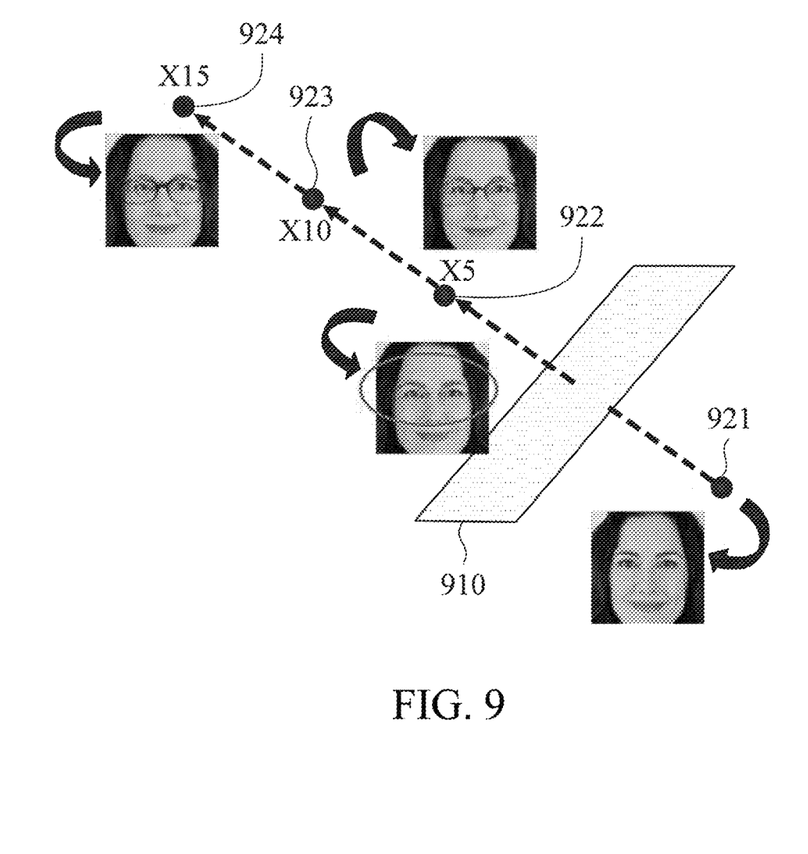
FIG. 9 is a schematic diagram of filtering the face image having particular attributes in accordance with an embodiment.

In some embodiments, the generated face images are filtered based on whether it has a predetermined attribute. FIG. 9 is a schematic diagram of filtering the face image having particular attributes in accordance with an embodiment. In the embodiment of FIG. 9, the right-hand side of a hyperplane 910 is the category without glasses, and the left-hand side of the hyperplane 910 is the category with glasses. The purpose of the facial attribute editing algorithm in this example is to transform the image without glasses into an image with glasses. A coordinate point 921 represents the feature vector of the inputted face image. A coordinate point 922 represents a generation vector after mapping the coordinate point 921 into the other side of the hyperplane 910. The distance between the coordinate point 922 and the hyperplane 910 is five times of the distance between the coordinate point 921 and the hyperplane 910. The distance between a coordinate point 923 and the hyperplane 910 is ten times of the distance between the coordinate point 921 and the hyperplane 910. The distance between a coordinate point 924 and the hyperplane 910 is fifteen times of the coordinate point 921 and the hyperplane 910. Different face images are generated by adjusting the distance to the hyperplane 910. In the embodiment, the feature of glasses is not obvious when the distance is only 5 times. A second classifier (e.g. glasses classifier) is used to determine if the generated face images corresponding to the coordinate points 922-924 has a predetermined attribute (i.e. containing glasses), and if not, the generated face images are deleted. In the example, the generated face image corresponding to the coordinate point 922 is deleted. When the attribute is about a mask, the second classifier is configured to determine if the face images contain a mask, and so on.

Figure 10:
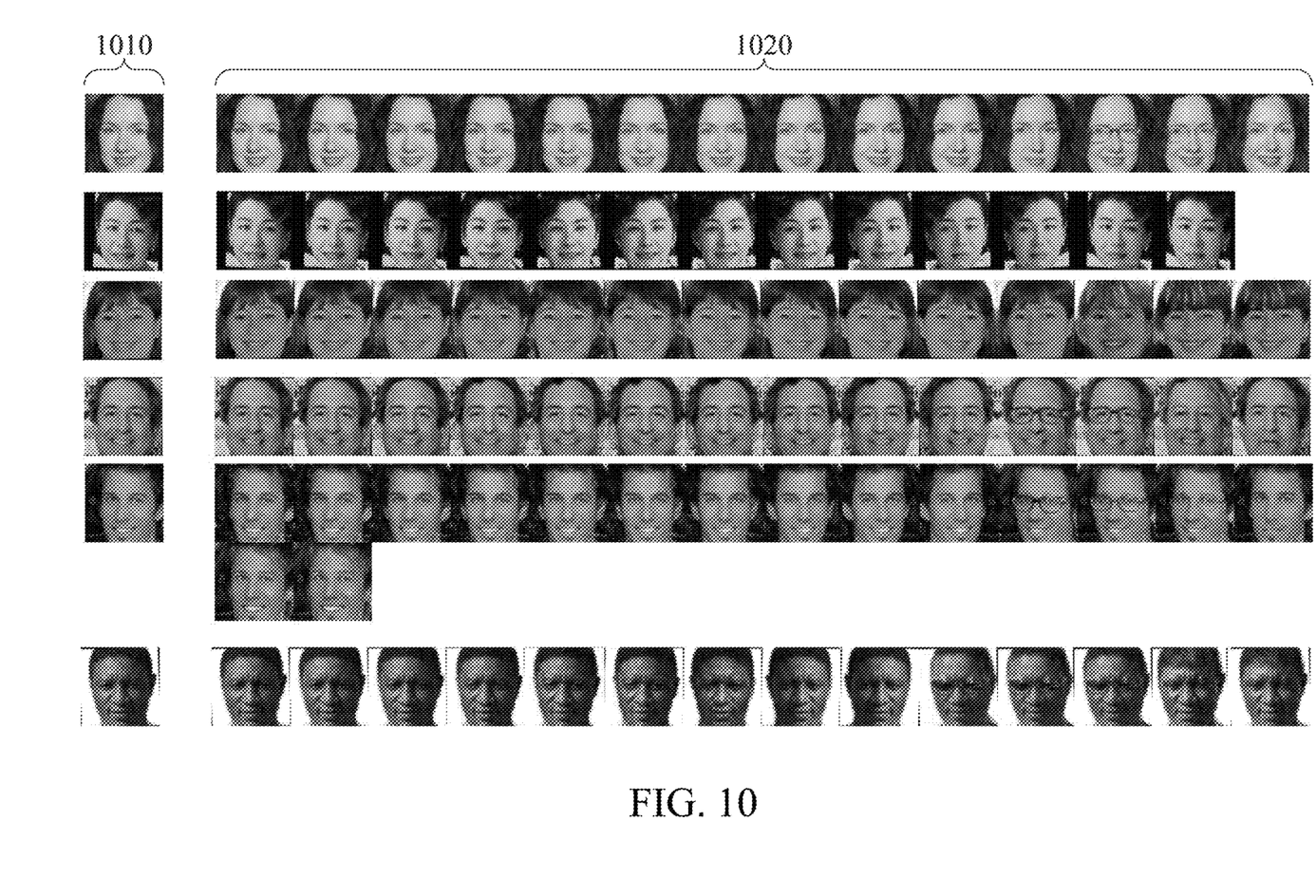
FIG. 10 is a diagram illustrating experiment results of the method for increasing face images in accordance with an embodiment.

Referring to FIG. 2, after the filtering is performed in the step 208, the inputted face image and the remaining generated face images are added into a database 209. In some embodiments, several face images of the user are captured. When the number of the captured face images is less than a predetermined value (e.g. 5), the method of FIG. 2 is performed. However, the method of FIG. 2 may be performed regardless the number of the face images. The experiment results are shown in FIG. 10. Multiple face images 1020 with different attributes and pose directions are generated based on original face images 1010. Accordingly, the number of the face image is increased and that is beneficial for subsequent applications.

From another aspect, a non-transitory computer readable storage medium is provided. The medium may be a random access memory, a read-only memory, a flash memory, floppy disks, hard disks, CD-ROMs, pen drives, tapes, or databases accessible via the Internet for storing instructions which are executed by a computer system to perform the method of FIG. 2.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method performed by a computer system, the method comprising:
capturing a face image and determining whether the face image belongs to a front direction or a side direction;
transforming the face image into a feature vector;
performing a facial attribute editing algorithm according to the feature vector to generate a first generation vector, wherein at least one attribute of the first generation vector is different from that of the face image;
if the face image belongs to the side direction, performing a facial pose conversion algorithm according to the feature vector to generate a second generation vector, wherein a pose direction of the second generation vector is different from that of the face image;
inputting the first generation vector or the second generation vector into a generative adversarial network to output at least one generated face image; and
adding the face image and the at least one generated face image into a database,
wherein determining whether the face image belongs to the front direction or the side direction comprising:
flipping the face image along a central axis to obtain a flipped image;
calculating a structural similarity index between the face image and the flipped image; and
if the structural similarity index is less than a threshold, determining that the face image belongs to the side direction, otherwise determining that the face image belongs to the front direction.

2. The method of claim 1, wherein the step of transforming the face image into the feature vector comprises:
inputting the face image into an encoder to obtain an initial feature vector;
inputting the initial feature vector and a noise vector into a generator to obtain a reconstructed image;
calculating a loss function between the face image and the reconstructed image; and
adjusting the initial feature vector and the noise vector according to the loss function for a plurality of iterations, and setting the initial feature vector corresponding to a minimum of the loss function among the iterations as the feature vector.

3. The method of claim 1, further comprising:
determining if the at least one generated face image belongs to human face according to a first classifier, and if not, deleting the at least one generated face image; and
determining if the face image and the at least one generated face image belongs to a same person according to a recognizer, and if not, deleting the at least one generated face image.

4. The method of claim 1, further comprising:
determining if the at least one generated face image has a predetermined attribute according to a second classifier, and if not, deleting the at least one generated face image.

5. A system comprising:
an image capture device configured to obtain a face image; and
a computer system communicatively connected to the image capture device and configured to perform a plurality of steps:
obtaining the face image and determining whether the face image belongs to a front direction or a side direction;
transforming the face image into a feature vector;
performing a facial attribute editing algorithm according to the feature vector to generate a first generation vector, wherein at least one attribute of the first generation vector is different from that of the face image;
if the face image belongs to the side direction, performing a facial pose conversion algorithm according to the feature vector to generate a second generation vector, wherein a pose direction of the second generation vector is different from that of the face image;
inputting the first generation vector or the second generation vector into a generative adversarial network to output at least one generated face image; and
adding the face image and the at least one generated face image into a database,
wherein determining whether the face image belongs to the front direction or the side direction comprising:
flipping the face image along a central axis to obtain a flipped image;
calculating a structural similarity index between the face image and the flipped image; and
if the structural similarity index is less than a threshold, determining that the face image belongs to the side direction, otherwise determining that the face image belongs to the front direction.

6. The system of claim 5, wherein the step of transforming the face image into the feature vector comprises:
inputting the face image into an encoder to obtain an initial feature vector;
inputting the initial feature vector and a noise vector into a generator to obtain a reconstructed image;
calculating a loss function between the face image and the reconstructed image; and
adjusting the initial feature vector and the noise vector according to the loss function for a plurality of iterations, and setting the initial feature vector corresponding to a minimum of the loss function among the iterations as the feature vector.

7. The system of claim 5, wherein the plurality of steps further comprise:
determining if the at least one generated face image belongs to human face according to a first classifier, and if not, deleting the at least one generated face image; and
determining if the face image and the at least one generated face image belongs to a same person according to a recognizer, and if not, deleting the at least one generated face image.

8. The system of claim 5, wherein the plurality of steps further comprise:
determining if the at least one generated face image has a predetermined attribute according to a second classifier, and if not, deleting the at least one generated face image.

9. A non-transitory computer readable storage medium storing a plurality of instructions which are configured to perform a plurality of steps:
capturing a face image and determining whether the face image belongs to a front direction or a side direction;
transforming the face image into a feature vector;

performing a facial attribute editing algorithm according to the feature vector to generate a first generation vector, wherein at least one attribute of the first generation vector is different from that of the face image;

if the face image belongs to the side direction, performing a facial pose conversion algorithm according to the feature vector to generate a second generation vector, wherein a pose direction of the second generation vector is different from that of the face image;

inputting the first generation vector or the second generation vector into a generative adversarial network to output at least one generated face image; and adding the face image and the at least one generated face image into a database, wherein determining whether the face image belongs to the front direction or the side direction comprising:

flipping the face image along a central axis to obtain a flipped image;

calculating a structural similarity index between the face image and the flipped image; and if the structural similarity index is less than a threshold, determining that the face image belongs to the side direction, otherwise determining that the face image belongs to the front direction.

10. The non-transitory computer readable storage medium of claim 9, wherein the step of transforming the face image into the feature vector comprises:

inputting the face image into an encoder to obtain an initial feature vector;

inputting the initial feature vector and a noise vector into a generator to obtain a reconstructed image;

calculating a loss function between the face image and the reconstructed image; and adjusting the initial feature vector and the noise vector according to the loss function for a plurality of iterations, and setting the initial feature vector corresponding to a minimum of the loss function among the iterations as the feature vector.

11. The non-transitory computer readable storage medium of claim 9, wherein the plurality of steps further comprise:

determining if the at least one generated face image belongs to human face according to a first classifier, and if not, deleting the at least one generated face image; and determining if the face image and the at least one generated face image belongs to a same person according to a recognizer, and if not, deleting the at least one generated face image.

12. The non-transitory computer readable storage medium of claim 9, wherein the plurality of steps further comprise:

determining if the at least one generated face image has a predetermined attribute according to a second classifier, and if not, deleting the at least one generated face image.

* * * * *